US007907531B2

(12) United States Patent
Jha et al.

(10) Patent No.: US 7,907,531 B2
(45) Date of Patent: Mar. 15, 2011

(54) APPARATUS AND METHODS FOR MANAGING FIRMWARE VERIFICATION ON A WIRELESS DEVICE

(75) Inventors: Sanjay K. Jha, San Diego, CA (US); Behrooz L. Abdi, Carlsbad, CA (US); Clifton Eugene Scott, San Diego, CA (US); Kenny Fok, San Diego, CA (US); Tia Manning Cassett, San Diego, CA (US); Jihyun Hwang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1101 days.

(21) Appl. No.: 11/303,156

(22) Filed: Dec. 15, 2005

(65) Prior Publication Data

US 2006/0280150 A1 Dec. 14, 2006

Related U.S. Application Data

(60) Provisional application No. 60/690,209, filed on Jun. 13, 2005.

(51) Int. Cl.
*H04J 3/14* (2006.01)
*H04L 12/26* (2006.01)
*G06F 9/44* (2006.01)
*H04W 4/00* (2009.01)

(52) U.S. Cl. ......... 370/241; 370/328; 370/464; 717/126

(58) Field of Classification Search ......... None
See application file for complete search history.

(56) References Cited

U.S. PATENT DOCUMENTS

| 6,259,442 | B1 * | 7/2001 | Britt et al. ............ 715/721 |
| 6,678,741 | B1 | 1/2004 | Northcutt et al. |
| 6,754,895 | B1 | 6/2004 | Bartel et al. |
| 7,246,266 | B2 * | 7/2007 | Sneed et al. ............ 714/27 |
| 7,412,233 | B2 | 8/2008 | Vishwanath |
| 2002/0147941 | A1 * | 10/2002 | Gentile ............ 714/36 |
| 2003/0066062 | A1 | 4/2003 | Brannock et al. |
| 2003/0217193 | A1 | 11/2003 | Thurston et al. |

(Continued)

FOREIGN PATENT DOCUMENTS

| EP | 1533695 A1 | 5/2005 |
| TW | 432334 B | 5/2001 |
| TW | 583586 Y | 4/2004 |

OTHER PUBLICATIONS

International Search Report, (ISR) PCT/US2006/023047, International Search Authority, Sep. 13, 2007.

(Continued)

*Primary Examiner* — Chi H Pham
*Assistant Examiner* — Soon-Dong D Hyun
(74) *Attorney, Agent, or Firm* — Abdollah Katbab; Won Tae C Kim

(57) ABSTRACT

Apparatus, methods, processors and machine readable media for verifying the integrity of firmware on a wireless device. Aspects include generating a verification scheme for testing the integrity of firmware on a wireless device and transmitting the verification scheme to the wireless device. The wireless device applies the verification scheme to the firmware and obtains a verification test result, which is forwarded for analysis. An analyzer compares the generated verification test result with a predetermined test result to obtain an integrity determination that indicates the integrity of the firmware. In some aspects, control commands to change an operational characteristic of the wireless device may be generated based on the integrity determination.

47 Claims, 8 Drawing Sheets

U.S. PATENT DOCUMENTS

| | | | |
|---|---|---|---|
| 2004/0025036 | A1 | 2/2004 | Balard et al. |
| 2004/0068721 | A1 | 4/2004 | O'Neill et al. |
| 2004/0103347 | A1 | 5/2004 | Sneed et al. |
| 2004/0192288 | A1* | 9/2004 | Vishwanath .................. 455/423 |
| 2004/0198319 | A1 | 10/2004 | Whelan et al. |
| 2004/0268339 | A1* | 12/2004 | Van Someren et al. ....... 717/172 |
| 2005/0055595 | A1 | 3/2005 | Frazer et al. |
| 2007/0150524 | A1* | 6/2007 | Eker et al. ..................... 707/203 |

OTHER PUBLICATIONS

Written Opinion of the International Searching Authority, PCT/US2006/023047, international Search Authority, Jun. 7, 2007.

International Preliminary Report on Patentability,(IPRP), PCT/US2006/023047, International Search Authority, Dec. 17, 2007.

Taiwanese Search report - 095121022 - TIPO - Apr. 17, 2010.

* cited by examiner

APPARATUS AND METHODS FOR MANAGING FIRMWARE VERIFICATION ON A WIRELESS DEVICE

CLAIM OF PRIORITY UNDER 35 U.S.C. §119

The present application for patent claims priority to Provisional Application No. 60/690,209 entitled "METHOD AND APPARATUS FOR FIRMWARE VERIFICATION ON A WIRELESS DEVICE," filed Jun. 13, 2005, and assigned to the assignee hereof and hereby expressly incorporated by reference herein.

BACKGROUND

The described aspects generally relate to wireless communications devices and computer networks. More particularly, the described aspects relate to verifying the integrity of the firmware of a wireless device, along with the collection, reporting and analysis of firmware-related information gathered from the wireless device.

Wireless networking connects one or more wireless devices to other computer devices without a direct electrical connection, such as a copper wire or optical cable. Wireless devices communicate data, typically in the form of packets, across a wireless or partially wireless computer network and open a "data" or "communication" channel on the network such that the device can send and receive data packets. The wireless devices often have wireless device resources, such as programs and hardware components, which individually and cooperatively operate to use and generate data in accordance to their design and specific protocol or configuration, such as using open communication connections to transmit and receive data on the network.

Further, these wireless devices contain firmware that comprises data and program code that enable the wireless device to operate. This data and program code is critical to the operation of the wireless device. For example, the data and program code may specify the protocol for the wireless device to use to communicate with the network, or the data and program code may specify the wireless network(s) with which the wireless device may operate.

In one aspect, the integrity of the firmware of a wireless device relates to whether the values in the firmware of a wireless device are the correct values for that version of the firmware. For example, a measure of firmware integrity may determine if the firmware has been corrupted, either unintentionally, such as by a bug in a program, or intentionally, such as by a computer virus or intentional manipulation. In another aspect, the integrity of the firmware of a wireless device relates to whether or not the version of the firmware is the current version for the wireless device. The version of firmware for a given wireless device may need to be updated or replaced on a periodic basis. Further, it is even possible that the wireless device has the wrong firmware installed, or that the firmware installed is not acceptable to a particular wireless network provider.

Many problems may occur if the integrity of the firmware of the wireless device is compromised. For example, the wireless device may not function or may interfere with the operation of the network by using incorrect communications protocols on the wireless network. In another example, changes in the firmware may allow the wireless device to be used for a different wireless network service provider than the one for which it was purchased. In this case, the original wireless network service provider may lose money if it subsidized the price of the wireless device based on the agreement that the wireless device would only be used on the original network service provider's network. Thus, changing the firmware so that the wireless device will operate with another wireless network service provider may violate the agreement signed by the owner of the wireless device.

Accordingly, it would be advantageous to provide an apparatus and method that allows for verification of firmware integrity on a wireless device.

BRIEF SUMMARY

The described aspects comprise apparatus, methods, computer readable media and processors operable for firmware verification on a wireless device.

In some aspects, a wireless communication device comprises a computer platform having firmware, and a firmware verification module operable to execute a verification configuration to collect firmware information, wherein the firmware information is indicative of an integrity of the firmware.

In other aspects, a wireless device comprises a means for controlling operations on the wireless device, and a means for applying a verification configuration to the means for controlling operations of the wireless device to collect information indicative of an integrity of the means for controlling operations of the wireless device.

In yet others aspects, an apparatus for managing the integrity of firmware on a wireless device comprises a firmware management module operable to generate and transmit a verification configuration to the wireless device. The verification configuration comprises a verification scheme to apply to the firmware to test an integrity of the firmware. The apparatus further comprises an information repository operable to receive and store a generated verification test result based on an execution of the verification configuration by the wireless device. Additionally, the apparatus comprises an analyzer operable to generate an integrity determination based on the generated verification test result, wherein the integrity determination represents an integrity of the firmware.

In still other aspects, an apparatus for managing firmware integrity on a wireless device comprises a generator means for generating and transmitting a verification configuration across a wireless network to a wireless device. The verification configuration comprises a verification scheme to apply to the firmware to test an integrity of the firmware. The apparatus further comprises a storing means for receiving and storing a verification test result based on an execution of the verification configuration by the wireless device. Additionally, the apparatus further comprises an analysis means for analyzing the verification test result and generating a report based on the analysis, wherein the report comprises an integrity determination indicating an integrity of the firmware.

In other aspects, a method of verifying firmware integrity on a wireless device comprises generating a verification configuration comprising a verification scheme to test an integrity of firmware on the wireless device, forwarding the verification configuration to a wireless device, receiving a generated verification test result based on an application of the verification scheme on the firmware by the wireless device, and generating an integrity determination based on the generated verification test result, wherein the integrity determination indicates the integrity of the firmware.

In further aspects, a method of verifying firmware integrity on a wireless device comprises receiving a verification scheme for testing an integrity of firmware on the wireless device, generating a verification test result based on applying the verification scheme to the firmware, and forwarding the verification test result for analysis to determine the integrity of the firmware.

In some aspects, a machine-readable medium comprises instructions which, when executed by a machine, cause the machine to perform operations including generating a verification configuration comprising a verification scheme to test an integrity of firmware on the wireless device, forwarding the verification configuration to a wireless device, receiving a generated verification test result based on an application of the verification scheme on the firmware by the wireless device, and generating an integrity determination based on the generated verification test result, wherein the integrity determination indicates the integrity of the firmware. In some related aspects, at least on processor may be configured to perform the above-stated actions.

In other aspects, a machine-readable medium comprises instructions which, when executed by a machine, cause the machine to perform operations including receiving a verification scheme for testing an integrity of firmware on the wireless device, generating a verification test result based on applying the verification scheme to the firmware, and forwarding the verification test result for analysis to determine the integrity of the firmware. In related aspects, at least on processor may be configured to perform the above-stated actions.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
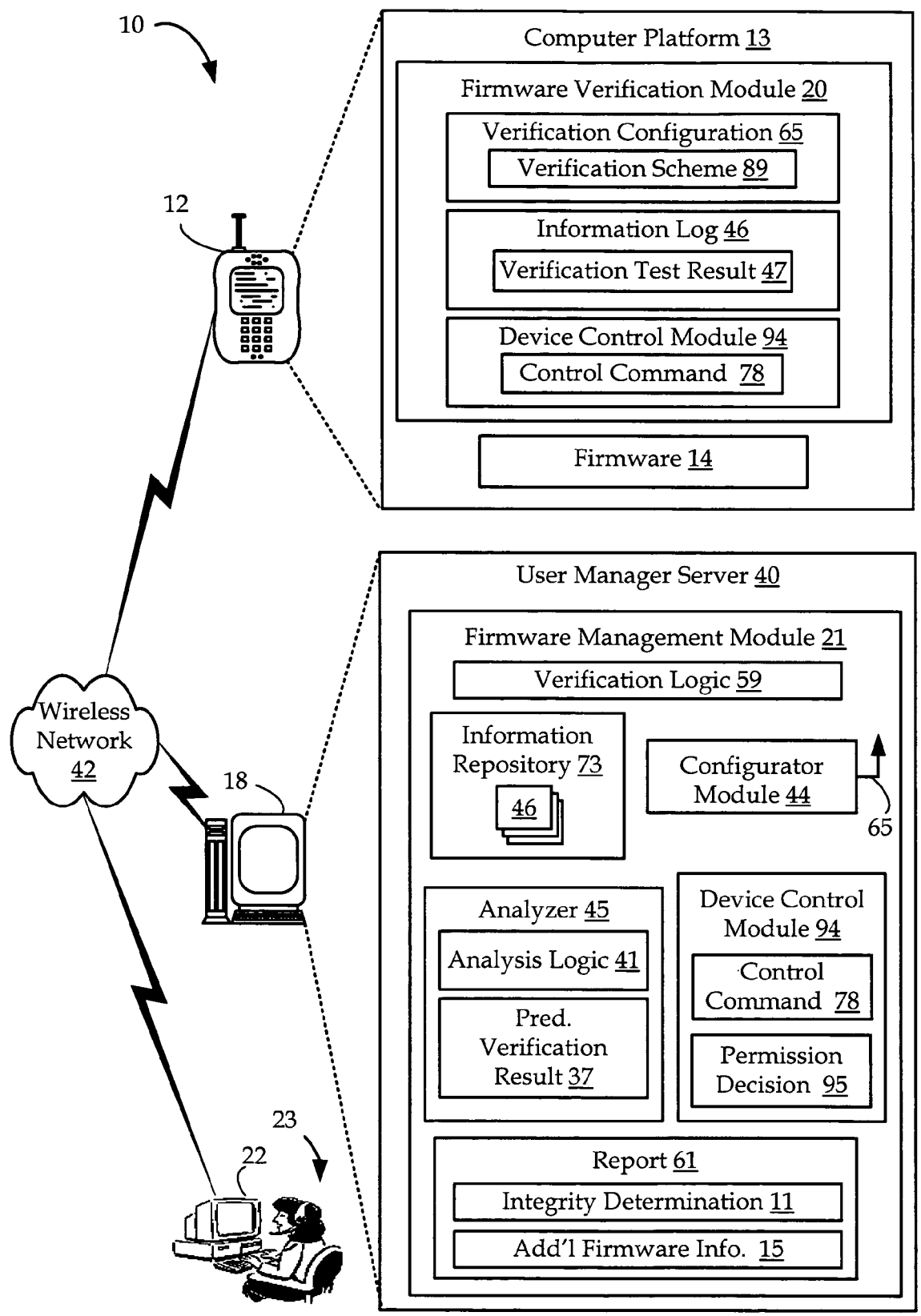
FIG. 1 is a schematic diagram of one aspect of a system for verifying the integrity of the firmware on the wireless device.
Figure 2:
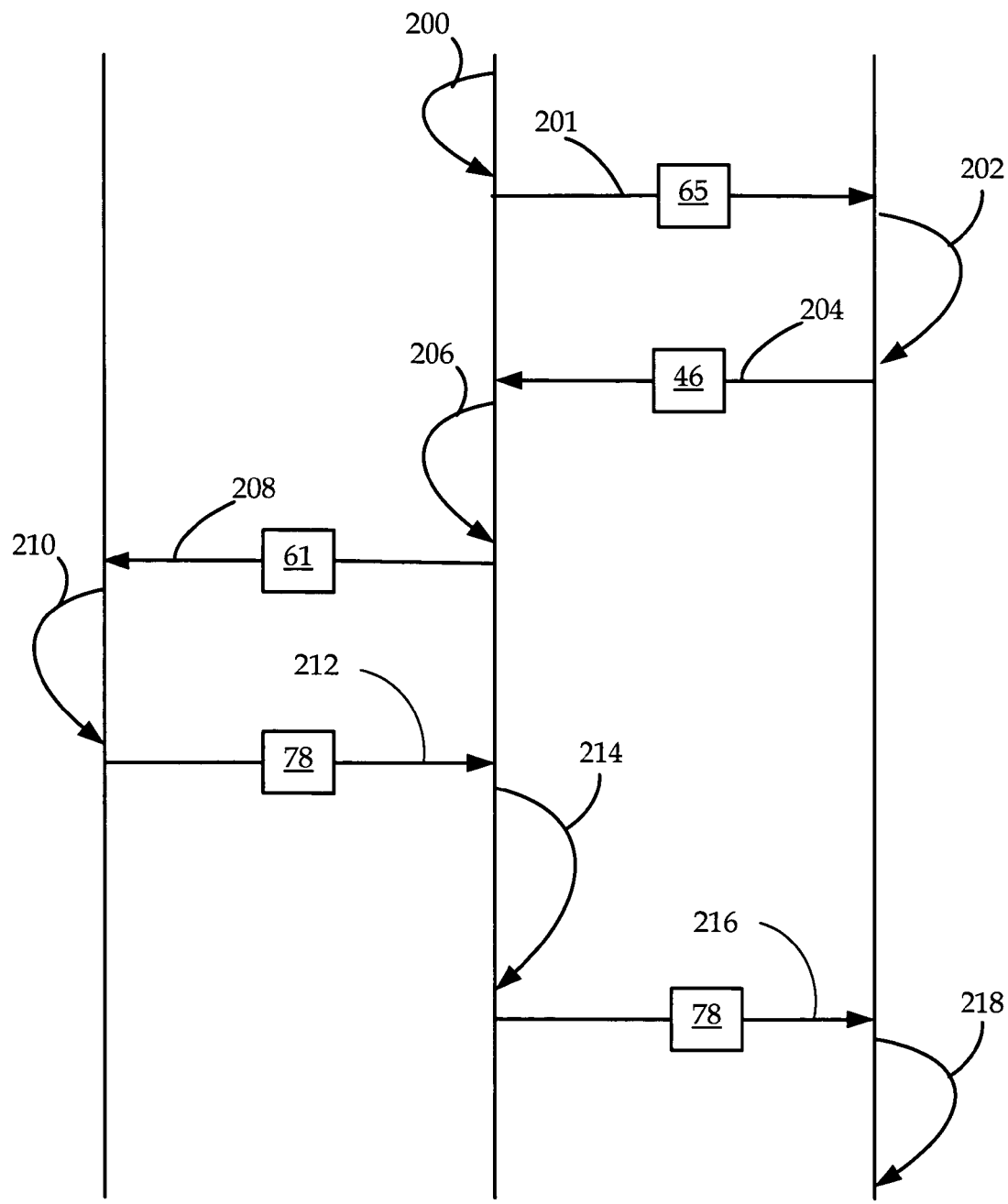
FIG. 2 is a message flow diagram associated with one aspect of an operation of the system of FIG. 1.

Referring to FIGS. 1 and 2, one aspect of a wireless device firmware verification system 10 for making a firmware integrity determination 11 includes a wireless device 12 having a resident firmware verification module 20 that checks the integrity of resident firmware 14 based on a verification configuration 65. In this aspect, verification configuration 65 is generated by and received from a remote firmware management module 21 associated with a user manager server 40 (Events 200 and 201). For example, user manager server 40 may be resident on a computer device 18, such as a server, located across a wireless network 42 from wireless device 12. Further, for example, verification configuration 65 may be generated by executing a configurator module 44 associated with firmware management module 21. Verification configuration 65 includes, in one aspect, a verification scheme 89 executable by wireless device 12 to apply to firmware 14 to generate a verification test result 47 (Event 202). For example, in one aspect, verification scheme 89 includes, but is not limited to, a predetermined redundancy check that is applied to at least a portion of firmware 14 to generate a checksum value as the verification test result 47. It should be noted, however, that other verification schemes 89 may be utilized and verification test results 47 may be obtained, as is discussed below in more detail. In any case, the resident firmware verification module 20 stores verification test result 47, for example, in an information log 46. Further, in one aspect, firmware verification module 20 forwards information log 46 across wireless network 42 to user manager server 40 (Event 204). User manager server 40 may operate to store information log 46 in information repository 73.

Firmware management module 21 associated with the user manager server 40 accesses information log 46 and executes an analyzer 45 to generate an integrity report 61 that reflects the integrity of firmware 14 on wireless device 12 (Event 206). For example, in one aspect, analyzer 45 includes a predetermined verification result 37 which it compares to the generated verification test result 47 in the information log 46 to produce integrity determination 11. Predetermined verification result 37 comprises known data or information, in any format, that corresponds to the result of the application of predetermined verification scheme 89 to an unaltered version of firmware 14. In the aspect discussed above, for example, predetermined verification result 37 may include a predetermined checksum value, which is compared to the generated checksum value mentioned above. In this case, if there is a match between predetermined verification result 37 and generated verification test result 47, then integrity determination 11 may be an output that indicates that firmware 14 is unaltered, or is of a proper state. Alternatively, for example, if there is not a match, then integrity determination 11 may be an output that indicates that firmware 14 has been altered. Further, analyzer 45 generates integrity report 61 that includes integrity determination 11, and, based on verification configuration 65, which may further include additional firmware information 15 associated with firmware 14, as is discussed below in more detail.

Firmware management module 21 may then execute to transmit integrity report 61 to an operator computer 22 for analysis (Event 208.) In one aspect, for example, an operator 23 at operator computer 22 then reviews integrity report 61 and, based on the contents of report 61, may make a decision to send a control command 78 to the wireless device 12 via user manager server 40 (Events 210, 212 and 216). In one aspect, operator 23 executes firmware management module 21 to transmit control command 78 across wireless network 42 to wireless device 12. For example, control command 78 includes, but is not limited to, commands such as: a "disable" command to shut down the ability of the user of wireless device 12 to communicate with wireless network 42; a "reconfigure" command to reload or reset a firmware configuration; and an "enable" command to re-establish the ability of the user of wireless device 12 to communicate with wireless network 42. As an example, operator 23 may decide to disable wireless device 12 to protect wireless network 42 from the wireless device 12 sending messages that do not conform to the proper protocol for the wireless network 42. Similarly, a "reconfigure" command may be sent to correct altered firmware 14 to restore the firmware and return it to its predetermined unaltered state, and an "enable" command may be sent after a "disable" command to allow communications once altered firmware 14 is corrected.

Additionally, in one aspect, firmware management module 21 may include a device control module 94 which reviews control command 78 and makes a permission decision 95 as to whether or not to send control command 78 to wireless device 12 (Event 214). For example, as will be discussed in more detail below, permission decision 95 may be based on a source or generator of control command 78, the type of action associated with control command 78, and other factors associated with wireless device 12 and its associated wireless network 42. Further, in some aspects, device control module 94 may query the source of control command 78 to confirm and/or verify the control command before sending it to wireless device 12, as will be discussed below in more detail.

In conjunction, in one aspect, firmware verification module 20 may include a device control module 94, which receives and executes control command 78 (Event 218). In other aspects, local device control module 94 may query the source or generator of control command 78 to confirm the control command before executing it. Further, in addition or in the alternative, device control module 94 may query user manager 40 to verify that control command 78 is valid and/or that the originator of control command 78 has the authorization to issue the command.

Thus, the present apparatus, methods, computer-readable media and processors provide for generating and applying verification scheme 89 to firmware 14 of wireless device 12 in order to obtain verification test result 47 to use in making integrity determination 11. Further, the described aspects may provide for the collection, analysis, and reporting of additional firmware information 15 based on verification configuration 65, and may further allow for control commands 78 to be executed on the wireless device 12 in response to integrity determination 11.

Figure 3:
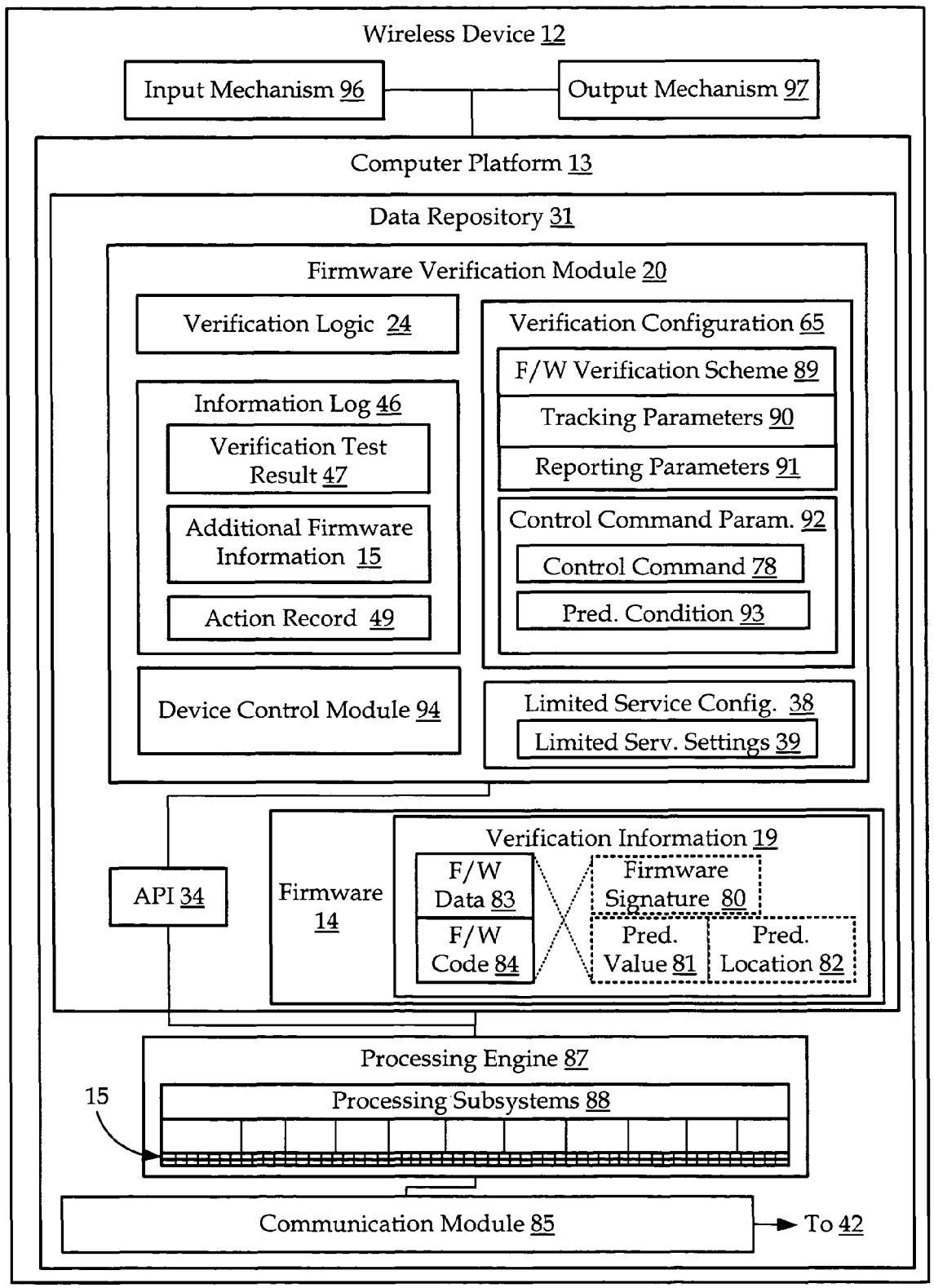
FIG. 3 is a schematic diagram of one aspect of the wireless device of FIG. 1.

Referring to FIG. 3, wireless device 12 can include any type of computerized, wireless device, such as cellular telephone 12, personal digital assistant, two-way text pager, portable computer, and even a separate computer platform that has a wireless communications portal, and which also may have a wired connection to a network or the Internet. The wireless device can be a remote-slave, or other device that does not have an end-user thereof but simply communicates data across the wireless network 42, such as remote sensors, diagnostic tools, data relays, and the like. The apparatus and method of firmware verification, collecting, and reporting on the wireless device can accordingly be performed on any form of wireless device or computer module, including a wired or wireless communication portal, including without limitation, wireless modems, PCMCIA cards, access terminals, personal computers, telephones, or any combination or sub-combination thereof.

Additionally, wireless device 12 has input mechanism 96 for generating inputs into wireless device, and output mechanism 97 for generating information for consumption by the user of the wireless device. For example, input mechanism 96 may include a mechanism such as a key or keyboard, a mouse, a touch-screen display, voice recognition module, etc. Further, for example, output mechanism 97 may include a display, an audio speaker, a haptic feedback mechanism, etc.

Further, wireless device 12 has computer platform 13 that can transmit data across wireless network 42, and that can receive and execute software applications and display data transmitted from user manager server 40 or another computer device connected to wireless network 42. Computer platform 13 includes a data repository 31, which may comprise volatile and nonvolatile memory such as read-only and/or random-access memory (RAM and ROM), EPROM, EEPROM, flash cards, or any memory common to computer platforms. Further, data repository 31 may include one or more flash memory cells, or may be any secondary or tertiary storage device, such as magnetic media, optical media, tape, or soft or hard disk.

Further, computer platform 13 also includes a processing engine 87, which may be an application-specific integrated circuit ("ASIC"), or other chipset, processor, logic circuit, or other data processing device. Processing engine 87 or other processor such as ASIC may execute an application programming interface ("API") layer 34 that interfaces with any resident programs, such as firmware verification module 20, in a data repository 31 of the wireless device 12. API 34 is a runtime environment executing on the respective wireless device. One such runtime environment is Binary Runtime Environment for Wireless® (BREW®) software developed by Qualcomm, Inc., of San Diego, Calif. Other runtime environments may be utilized that, for example, operate to control the execution of applications on wireless computing devices.

Processing engine 87 includes various processing subsystems 88 embodied in hardware, firmware, software, and combinations thereof, that enable the functionality of wireless device 12 and the operability of the wireless device on wireless network 42. For example, processing subsystems 88 allow for initiating and maintaining communications, and exchanging data, with other networked devices. In one aspect, such as in a cellular telephone, communications processing engine 87 may include one or a combination of processing subsystems 88, such as: sound, non-volatile memory, file system, transmit, receive, searcher, layer 1, layer 2, layer 3, main control, remote procedure, handset, power management, diagnostic, digital signal processor, vocoder, messaging, call manager, Bluetooth® system, Bluetooth® LPOS, position determination, position engine, user interface, sleep, data services, security, authentication, USIM/SIM, voice services, graphics, USB, multimedia such as MPEG, GPRS, etc. For the disclosed aspects, processing subsystems 88 of processing engine 87 may include any subsystem components that interact with applications executing on computer platform 13. For example, processing subsystems 88 may include any subsystem components which receive data reads and data writes from API 34 on behalf of the resident firmware verification module 20. Further, all or a portion of additional firmware information 15 that is gathered and then logged in the information log 46 is available from these subsystems 88.

Computer platform 13 may further include a communications module 85 embodied in hardware, firmware, software, and combinations thereof, that enables communications among the various components of the wireless device 12, as well as between the wireless device 12 and the wireless network 42.

Additionally, computer platform 13 includes firmware 14, which may comprise any nonvolatile memory that contains data, such as firmware data 83, and/or a set of executable instructions, such as firmware code 84, that affect the operation of the wireless device 12. For example, firmware 14 may comprise software that is embedded in a hardware device. Some examples of nonvolatile memory include ROM, EPROM, EEPROM, and flash cards. Additionally, firmware 14 includes verification information 19 that is utilized to determine the integrity of firmware 14. For example, verification information 19 includes, but is not limited to, all or any portion of the data and/or executable instructions that comprise firmware 14, and may further include data that is a function of all or a portion of the data and/or executable instructions that comprise firmware 14. In one aspect, for example, verification information 19 includes a firmware signature 80, which is information that identifies and/or authenticates the given firmware. For example, firmware signature 80 includes, but is not limited to, data representative of at least one of a firmware name, a firmware version, a firmware size, a firmware manufacturer, etc. In another example, verification information 19 may include a predetermined value 81 stored at a predetermined location 82 within firmware 14, where any attempted alteration of firmware 14 would change the value and/or the location. In yet another aspect, verification information 19 includes all or a portion of the firmware data 83, and/or all or a portion of the firmware code 84. In this case, firmware data 83 and/or firmware code 84 may be operated on by verification scheme 89 to generate verification test result 47.

Computer platform 13 further includes firmware verification module 20 to manage firmware verification activities on wireless device 12. Firmware verification module 20 may include any hardware, software, firmware and/or other set of executable instructions operable to manage the collection on the wireless device 12, and transmission across the wireless network 42, of any information relating to the integrity of firmware 14 of the wireless device 12. In one aspect, firmware verification module 20 includes verification logic 24 that provides the capability to collect, store and provide access to, or forward, information based on verification configuration 65. Further, in some aspects, verification logic 24 may provide the capability to generate verification test result 47 and compare it with predetermined verification result 37 to generate integrity determination 11. Firmware verification module 20 may be initiated at any time, and verification test result 47 and/or additional firmware information 15 logged in the information log 46 may be stored on the wireless device 12 and obtained at any time via a wired or wireless connection to the wireless device 12.

Firmware verification module 20 can collect any firmware verification information relevant to firmware usage and/or verification. Based on verification configuration 65, firmware verification module 20 may apply firmware verification scheme 89 to the firmware 14 and generate verification test result 47. Further, firmware verification module 20 may store this information in an information log 46, either in resident data repository 31 or in another memory device connectable to the wireless device or accessible to the wireless device 12 over the wireless network 42. Further, information log 46 may include the details of verification configuration 65 in association with the collected firmware verification information.

In an aspect where predetermined verification result 37 is known to wireless device 12, for example, when it is included in verification configuration 89, firmware verification module 20 may then execute verification logic 24 to locally compare test result 47 with predetermined result 37 to derive the integrity 11 of the firmware 14. Thus, in one aspect, firmware verification module 20 provides wireless device 12 with a resident or self-contained capability for retrieving and recording firmware information on a wireless device 12, as well as for allowing the transmission and remote analysis of such firmware information.

Alternately, firmware verification module 20 may transmit test result 47 and/or information log 46 to another computer device to derive the integrity of the firmware 14 of the wireless device 12. For example, firmware verification module 20 may cause the wireless device 12 to selectively transmit information log 46 to user manager server 40 across wireless network 42. In one aspect, the information log 46 is transmitted over an open communication connection from the wireless device 12 to the wireless network 42, and thus "piggybacked" across an open connection, such as a voice or data call at the wireless device 12. In a cellular network configuration, the information log 46 can be transmitted to user manager server 40 through short message service.

In another aspect, remote user manager server 40 reads the information log 46 from the wireless device 12 through the resident firmware verification module 20, and in some instances, writes control commands 78 to computer platform 13 and alters the operation of the wireless device 12, such as re-setting firmware 14. Accordingly, the access to firmware verification module 20 allows the user manager server 40 to remotely control parameters for firmware verification information collection, analysis, and reporting.

Firmware verification module 20 operates based on verification configuration 65. Verification configuration 65 may be generated by any computer device connected to wireless network 42, or may be locally transmitted to the wireless device 12 such as by a manual input from a user, and/or through transmission from a locally-connected media reader, or may even have been loaded on the wireless device 12 at the time of manufacture. In one aspect, for example, verification configuration 65 is generated by the user manager server 40 as is explained below.

Verification configuration 65 includes instructions and data that dictate operations to be performed by firmware verification module 20. For example, as discussed above, verification configuration 65 may include verification scheme 89, which comprises instructions for testing the integrity of firmware 14. Verification scheme 89 may include, but is not limited to, instructions relating to tests such as: a redundancy check, including a checksum, parity bits, check digits, longitudinal redundancy check, cyclic redundancy check ("CRC"), horizontal redundancy check, vertical redundancy check, cryptographic message digest, Fletcher's checksum, and Adler-32; testing for a predetermined value at a predetermined location within firmware 14; and testing for a predetermined result of applying a predetermined function to all or a portion of the data and/or the code contained within firmware 14. Alternatively, verification scheme 89 may include instructions for retrieving a predetermined verification scheme from a predetermined source, such a from another computer device across wireless network 42. Further, for example, in order to keep track of changes to certain portions of firmware 14 or to increase security, firmware 14 may be segmented, and one or more verification schemes 89 may be applied to one or more of the segments of firmware 14. As such, verification scheme 89 may identify a scheme to apply to each segment of firmware 14.

Figure 4:
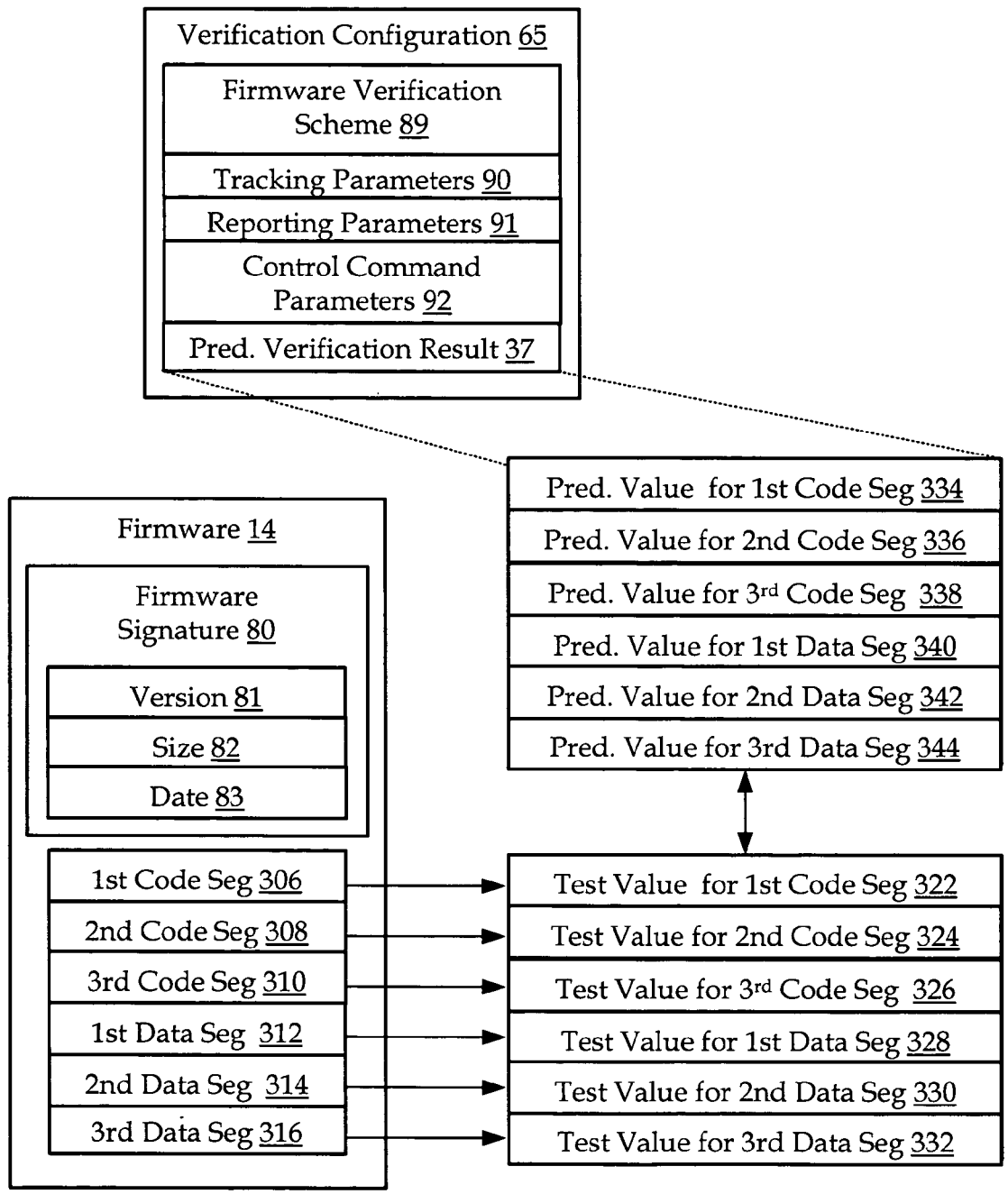
FIG. 4 is a schematic diagram of one aspect of a segmentation of the firmware of the wireless device of FIG. 3.

For example, referring to FIG. 4, one aspect of firmware verification scheme 89 comprises a CRC algorithm where the firmware verification module 20 applies the CRC algorithm to different segments of the firmware 14. In one aspect, firmware 14 is divided into a predetermined number of code segments, such as code segments 306, 308, 310, and a predetermined number of data segments, such as data segments 312, 314, 316. Verification logic 24 executes verification configuration 65 to apply the CRC algorithm to each segment 306, 308, 310, 312, 314, 316, and generate verification test result values 322, 324, 326, 328, 330, 332. Further, in this aspect, where verification configuration 65 includes predetermined verification result 37, verification logic 24 executes to compare the test result values 322, 324, 326, 328, 330, 332 to predetermined verification values 334, 336, 338, 340, 342, 344 to generate an integrity determination 11 for each segment of the firmware 14. In alternative cases, however, predetermined verification values 334, 336, 338, 340, 342, 344 may be stored at another computer device, such as at user manager 40, and the generated verification test result values 322, 324, 326, 328, 330, 332 are transmitted from wireless device 12 to the other device for the comparison. In any case, this method of splitting up the firmware into segments is advantageous for several reasons. First, if only one or more of the segments are found to have a problem with their integrity, then only those segments will need to be repaired. Further, if segments that are not critical to the operation of the wireless device are the only segments found to have a problem with their integrity, then the wireless device 12 may not have to be disabled. Further, many firmware verification schemes 89 may operate more reliably when applied to fewer data items of the firmware 14. For example, a firmware verification scheme 89 based on parity may be more reliable with fewer data items of the firmware 14.

Continuing to refer to FIG. 4, another firmware verification scheme 89 may simply log firmware signature 80. For example, in this case, firmware signature 80 may include values or data relating to a firmware version 81, a firmware size 82, and a current date 83. This information is then compared to predetermined verification test result values 37, which in this case are a predetermined firmware version, a predetermined firmware size, and a predetermined date, to determine the integrity of the firmware 14.

Additionally, referring back to FIG. 3, verification configuration 65 may further include a tracking parameter 90 that dictates which information to collect in information log 46 and how often to gather this information. For example, tracking parameter 90 may include instructions on how often to initiate verification scheme 89, and instructions to record the generated verification test result 47. Additionally, for example, tracking parameter 90 may include instructions that define which additional firmware information 15 to collect, and when to collect them. For example, tracking parameter 90 may identify predetermined status or state information to collect as additional firmware information 15 at predetermined times from predetermined applications and/or predetermined subsystems 88. Additional firmware information 15 may comprise, but is not limited to, any information relating to successful and/or unsuccessful firmware access attempts, changes made to the firmware, operations being performed by wireless device 12 and/or subsystems 88, wireless device diagnostic information, information relating to the state and/or operation of any resident applications on wireless device 12, etc. Further, for example, tracking parameter 90 dictate the tracking of certain activities or actions taking place on device, such as the execution of control command 78, and require the storage of information relating to these activities/actions in information log 46, such as in action record 49.

Further, verification configuration 65 may include a reporting parameter 91 that specifies when the firmware verification module 20 should report or transmit information log 46, or whom to allow access to information log 46. For example, reporting parameter 91 may include instructions to transmit information log 46 immediately after applying firmware verification scheme 89 to firmware 14. Other reporting parameters 91 may include instructions to transmit information log 46 at a predetermined time or a predetermined interval, or on the occurrence of predetermined events, such as upon establishing a communication channel with communications network 42.

Additionally, in an aspect, verification configuration 65 may include control command parameters 92, which may include control command 78 associated with a predetermined condition 93 in order to control operations on wireless device 12. For instance, in the case where wireless device 12 locally generates integrity determination 11 by comparing generated verification test result 47 with predetermined verification test result 37, control command parameters 92 may allow firmware verification module 20 to locally control wireless device 12 in the case where incorrect or altered firmware 14 is discovered. For example, condition 93 may be a certain integrity determination 11, such as: (1) a determination that indicates the proper firmware is present; and (2) a determination that indicates that firmware 14 has been altered. In the case of condition (1), then control command 78 may be a "continue operation" command to carry on operations of wireless device 12. In the case of condition (2), then control command 78 may be a "disable" command to shut down the ability of wireless device 12 to communicate with wireless network 42. There may be a wide variety of conditions 93 and corresponding control commands 78, depending on the given application, that may be included in control command parameter 92. For example, in some embodiments, the various parameters, comparisons and results may be recorded in information log 46. Additionally, the actions performed based on verification configuration 65, such as those actions associated with control command 78, may be recorded in action record 49 (FIG. 3).

Thus, verification configuration 65 provides a flexible means for controlling the operation of the firmware verification module 20.

Further, in some aspects, firmware verification module 20 includes device control module 94 operable to receive either a locally-generated or a remotely-generated control command 78. Further, device control module 33 may include control logic operable to execute control command 78 on the wireless device 12. As will be explained in more detail below, device control module 94 may verify a control command 78 before executing the control command 78 on the wireless device 12.

For example, control command 78 may be any operation that can be executed on the respective wireless device 12 and includes, but is not limited to, the commands such as a disable command, an enable command, and a reconfigure command, where the disable command makes the wireless device 12 non-operable for non-emergency communications or completely non-operable, where the enable command makes the wireless device 12 operational for communications, and where the reconfigure command sets at least one of the firmware values relating to an operational characteristic of the wireless device. In some embodiments, for example, the reconfigure command may include changing firmware data and/or values over-the-air, such as by including a software patch operable to over-write software on firmware 14. In general the control command 78 is issued either locally or remotely in response to the results of the firmware verification module 20 and will normally be in response to deriving the integrity of the firmware 14.

Further, firmware verification module 20 may include a limited service configuration 38 operable to establish a limited-access communications channel across the wireless network 42, which, in one aspect, is generally not available to the end user of wireless device 12. For example, the limited-access communications channel may be used for transmitting information log 46 or for receiving control command 78. Further, in the case when communications from wireless device 12 have otherwise been disabled, the limited-access communications channel may allow emergency calls, such as "911" calls, or may allow calls to an operator or other designated party associated with the wireless network provider. The identification and set-up of the limited-access communications channel is based on a limited service setting 39. Limited service setting 39 may identify the type of communications that are allowed, and may identify the associated communication channels that can be utilized. Limited service configuration 38 may be received over the wireless network 42, may be locally transferred to wireless device 12, such as through a serial connection, or may be preloaded on the wireless device 12.

Referring back to FIG. 1, wireless network 42 includes any communications network operable, at least in part, for enabling wireless communications between wireless device 12 and any other device connected to wireless network 42. Further, wireless network 42 may include all network components, and all connected devices that form the network. For example, wireless network 42 may include at least one, or any combination, of: a cellular telephone network; a terrestrial telephone network; a satellite telephone network; an infrared network such as an Infrared Data Association ("IrDA")-based network; a short-range wireless network; a Bluetooth® technology network; a ZigBee® protocol network; an ultra wide band ("UWB") protocol network; a home radio frequency ("HomeRF") network; a shared wireless access protocol ("SWAP") network; a wideband network, such as a wireless Ethernet compatibility alliance ("WECA") network, a wireless fidelity alliance ("Wi-Fi Alliance") network, and a 802.11 network; a public switched telephone network; a public heterogeneous communications network, such as the Internet; a private communications network; and land mobile radio network. Suitable examples of telephone networks include at least one, or any combination, of analog and digital networks/technologies, such as: code division multiple access ("CDMA"), wideband code division multiple access ("WCDMA"), universal mobile telecommunications system ("UMTS"), advanced mobile phone service ("AMPS"), time division multiple access ("TDMA"), frequency division multiple access ("FDMA"), orthogonal frequency division multiple access ("OFDMA"), global system for mobile communications ("GSM"), single carrier ("1×") radio transmission technology ("RTT"), evolution data only ("EV-DO") technology, general packet radio service ("GPRS"), enhanced data GSM environment ("EDGE"), high speed downlink data packet access ("HSPDA"), analog and digital satellite systems, and any other technologies/protocols that may be used in at least one of a wireless communications network and a data communications network.

User manager server 40 may comprise at least one of any type of hardware, software, firmware, server, personal computer, mini computer, mainframe computer, or any computing device either special purpose or general computing device. Further, user manager server 40 may reside entirely on the wireless device 12. Further, there can be separate servers or computer devices associated with user manager server 40 that work in concert to provide data in usable formats to parties, and/or to provide a separate layer of control in the data flow between the wireless devices 12 and user manager server 40. User manager server 40 (or plurality of modules) can send software agents or applications, such as the resident firmware verification module 20, to wireless device 12 across wireless network 42, such that the wireless device 12 returns information from its resident applications and subsystems. For example, wireless devices 12 may transmit the result of applying a firmware verification scheme 89 to firmware 14 in the form of an information log 46, where the user manager server 40 may then compare this result with predetermined verification result 37 to generate integrity determination 11 that represents the integrity of the firmware of the wireless device 12.

User manager 40 includes remote firmware management module 21 to manage firmware verification operations. Remote firmware management module 21 may include software, hardware, firmware, and generally any executable instructions operable by user manager server 40. Remote firmware management module 21 may download all or a portion of the resident version of firmware verification module 20 to a wireless device 12. Alternatively, the resident version of remote firmware management module 21 may be loaded onto the wireless device 12 during the initial assembly process or via direct connections during a configuration process. Further, remote firmware management module 21 includes verification logic 59 which is executable by user manager server 40 to generate verification configuration 65 and to manage the collection and analysis of information log 46 from wireless devices 12. Remote firmware management module 21 may "pull" the log 46 based on commands from a user, or the log may be "pushed" from the wireless devices 12 at predetermined times, upon reaching predetermined memory/data storage levels or upon reaching predetermined conditions such as the wireless device 12 providing improper protocols between the wireless device 12 and the wireless network 42.

Figure 5:
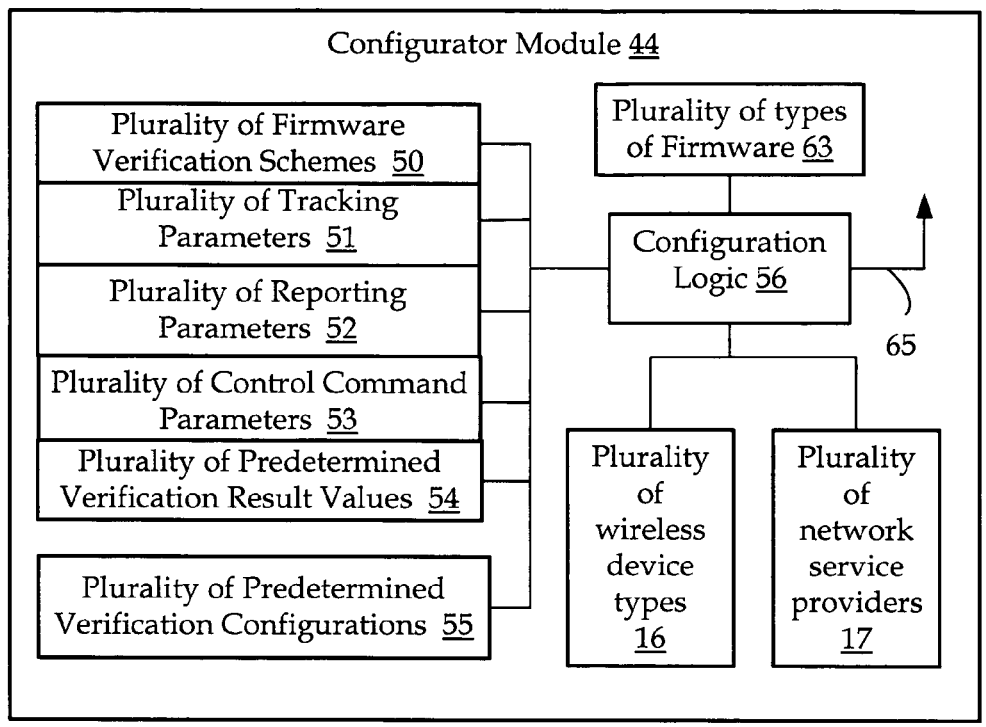
FIG. 5 is a schematic diagram of one aspect of a configurator module associated with the user manager of FIG. 1.

Referring to FIGS. 1 and 5, in one aspect, remote firmware management module 21 includes configurator module 44 that includes hardware, firmware, software and/or any other associated logic that allows the configurator module 44 to generate verification configuration 65. In one aspect, configurator module 65 executes configuration logic 56 which assembles the various components of a given verification configuration 65 based on making selections from a number of variable parameters. For example, that parameters that make up verification configuration 65 may vary depending on the type/make/model of the wireless device and/or the network service provider. As such, configuration logic 56 may provide a user with the ability to select from a menu of a plurality of wireless device types 16 and a plurality of network service providers 17 in order to generate a appropriate menu from which to select the parameters of verification configuration 65. Similarly, there may be one or more of each type of parameter to choose from to make up verification configuration 65. For example, verification logic 56 may provide a user with the ability to select from a menu of at least one of a plurality of firmware verification schemes 50, a plurality of tracking parameters 51, a plurality of reporting parameters 52, a plurality of control command parameters 53 and a plurality of predetermined verification result values 54. Alternatively, rather than selecting the various parameters individually, configuration logic 56 may provide the user with the ability to select from a menu of a plurality of predetermined verification configurations 55, which include predetermined groupings of the above-noted parameters that comprise verification configuration 65. Further, in one aspect, the selected one of the plurality of wireless device types 16 and the selected one of the plurality of network service providers 17 may be correlated to a given one of a plurality of types of firmware 65 and/or a predetermined set of verification parameters that are appropriate for a particular wireless device 12. For example, for an XYZ brand of wireless device operating on ABC wireless service provider, configuration logic 56 may be able to determine which firmware 14 the wireless device 12 should have installed, and thus may generate verification configuration 65 that includes the appropriate set of corresponding parameters.

Once verification configuration 65 is determined, configurator module 44 and/or remote firmware management module 21 is operable to transmit verification configuration 65 to one or more wireless devices 12 to initiate the tracking and management of firmware verification on that device.

Remote firmware management module 21 may include information repository 73 for storing information log 46, including verification test result 47 and/or additional firmware information 15, received from wireless device 12 based on executing verification configuration 65. Information repository 73 may include any type of memory or storage device. Although illustrated as being associated with remote firmware management module 21, information repository 73 may be located anywhere in communication with user manager 40, such as on another server or computer device connected to wireless network 42, on wireless device 12 or on a wireless network help computer 22.

Further, as noted above, remote firmware management module 21 may include analyzer 45, which may include hardware, software, firmware, and combinations thereof for analyzing and processing logged firmware verification information in the information repository 73 in order to generate a report 61 and integrity determination 11. Additionally, analyzer 45 may further include analysis logic 41 comprising algorithms, decision-making routines, statistical programs, etc. for analyzing and interpreting the information logs 46 contained in the information repository module 73. Although illustrated as being associated with remote firmware module 21, analyzer 45 may be located anywhere in communication with user manager server 40, on another server connected to wireless network 42, on wireless device 12 or on a wireless network help computer 22.

Additionally, it should be noted that since many firmware verification schemes 89 are heuristic, the derived integrity determination 11 of the firmware 14 may be a subjective value or probability. Further, as described earlier, the derived integrity determination 11 of the firmware 14 further may depend on which version 81 of the firmware 14 is installed in a particular make and/or model of wireless device 12 at a particular time. So, for example, the existing firmware 14 may not be corrupted and was the correct firmware 14 for the wireless device 12 at the time of manufacture, but may no longer be a current valid version 81 of firmware 14, thus, in this case, analyzer 45 may determine that the integrity of firmware 14 is compromised.

Additionally, in one aspect, firmware integrity determination 11 is a measure of both: whether or not the wireless device 12 has the correct firmware 14; and, whether or not the firmware on the wireless device 12 is, or may be, corrupted or a measure of a certainty that the firmware 14 is not corrupted. So, integrity determination 11 of firmware 14 on wireless device 12 may represent a low integrity if, for example, a wireless device 12 has a version of firmware 14 that is no longer supported by the network service provider, or if the version of the firmware 14 on the wireless device 12 may be corrupted as measured by a comparison of verification test result 47 with predetermined verification result 37. In some aspects, this comparison of verification test result 47 with predetermined verification result 37 may only be an indication of whether or not the firmware 14 is corrupted, and thus integrity determination 11 may be a probability or subjective category, e.g. "most likely," "10% chance," etc.

In one aspect, report 61 and/or information log 46 may be reviewed manually, such as by a technician, field engineer, carrier, operator 23 or the user of the wireless device 12, for evaluation of firmware verification-related information associated with a particular wireless device 12. Operator 23 or the user of the wireless device 12 may generate a new verification configuration 65 or control command 78, such as a "disable wireless device" command, for the respective wireless device 12 based on the information log 46 and/or on the report 61. Generally, report 61 may be useful in detecting and correcting problems related to firmware verification through analysis of information log 46. As such, report 61 includes any form of output that represents analysis of information log 46 and other information contained in the information repository 73, as well as any other associated information that may be incorporated in predetermined standards 37 such as reports of viruses, proper firmware versions for the wireless device 12, shut-down times for improper firmware versions etc.

Although illustrated as producing report 61, firmware management module 21 and its corresponding components can give a ready view of firmware-verification related information collected from the wireless devices 12 in any form, such as tables, maps, graphics views, plain text, interactive programs or web pages, or any other display or presentation of the data. For example, firmware management module 21 may present firmware verification related information on a monitor or display device, and/or may transmit this information, such as via electronic mail, to another computer device for further analysis or review. Also, firmware management module 21 may be executable to change verification configuration 65 and/or send a control command 78 to be executed on the respective wireless device 12 based on the information log 46 and/or based on the report 61 generated by analyzer 45.

Figure 6:
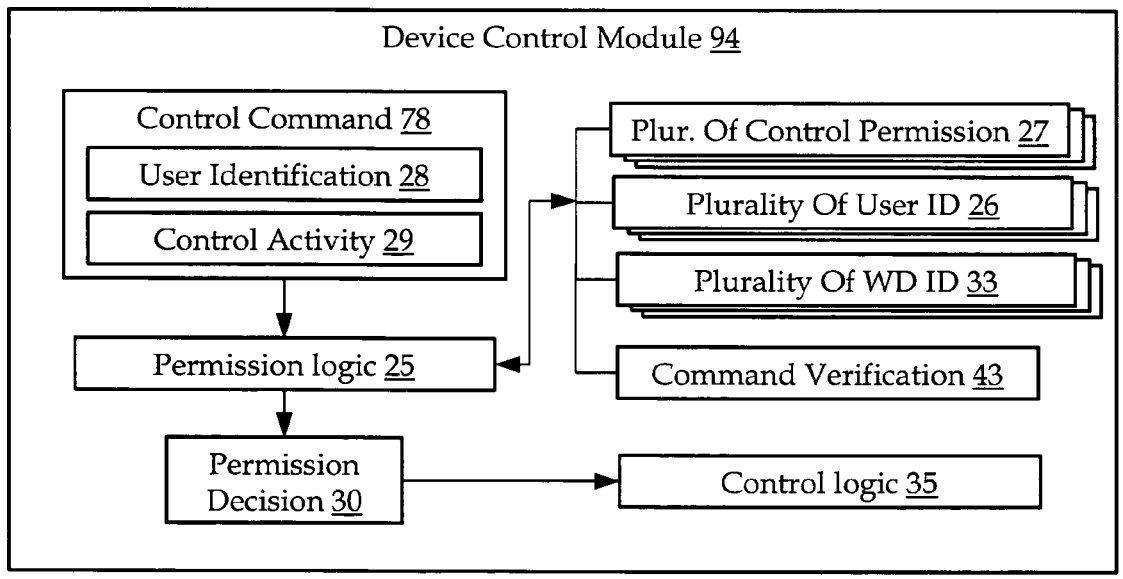
FIG. 6 is a schematic diagram of one aspect of device control module associated with the user manager and/or the wireless device of FIG. 1.

Referring to FIG. 6, both the remote firmware-verification module 21 and the firmware-verification module 20 may have a device control module 94 operable to receive/generate control command 78, either locally or remotely, and either execute control command 78 on wireless device 12 or transmit control command 78 to wireless device 12. In one aspect, for example, control command 78 may contain both a user identification ("ID") 28 and a control activity 29. User ID 28 may be some manner of identifying the originator of control command 78. For example, user ID 28 may be a name, a number, a digital signature, a hash, a digital certificate, or any other type of data or value that may be associated with a party. Further, user ID 28 may not be explicitly contained in the control command 78, but rather may be derived from the origin of control command 78. Additionally, control activity 29 is the operation to be performed by firmware verification module 20 through executing control command 78. As mentioned above, these operations include disabling communications, enabling communications, reconfiguring firmware and/or communications parameters, etc.

Before executing or forwarding the control command 78, device control manager 94 may execute permission logic 25 to check the authenticity or authority of the user issuing control command 78, and/or to verify and confirm that the user truly wants to initiate the command. The verification of a control command 78 may include, for example, a prompt to operator 23 (or other user) to confirm whether operator 23 actually wishes to execute control activity 29 on wireless device 12. The confirmation, or cancellation of the control command, may be received as command verification 43. Further, for example, to authenticate the control command, permission logic 25 may parse user ID 28 and control activity 29 from control command 78 and may utilize a database of a plurality of user IDs 26 correlated with a plurality of control permissions 27, and further correlated with a plurality of wireless device identifications (IDs) 33, in order to check the authorization for issuing control command 78. Control permissions 27 may identify one or more authorized control activities 29 for a given user ID 28 and/or wireless device IDs, which is an identification of a specific wireless device. For instance, certain users may be restricted to certain control activities, or to being able to control certain wireless devices.

It should be noted, however, that the plurality of user IDs 26, the plurality of control permissions 27 and the plurality of wireless device identifications (IDs) 33 may be correlated in any manner. For example, control command 78 may contain a user ID 28 of an operator 23, and a control activity 29 of "disable communications" for a particular one of the plurality of wireless device identifications 33. Permission logic 25 searches the database of control permissions 27 and user IDs 26 to determine if the operator 23 was permitted to disable the given wireless device 12. Permission logic 25 generates a permission decision 30 based on this authorization check, and/or based on the value of command verification 43.

As previously described in reference to FIG. 1, although operator 23 in this aspect is illustrated as a person, in other aspects operator 23 may be a computing device which may include hardware, software, firmware, and combinations thereof for analyzing and responding to report 61 or to an external communication such as from the user of the wireless device 12. Further, operator 23 may reside on the same computing device as the user manager server 40, which could be the wireless device 12. In one aspect, operator 23 is a person that may respond to a report 61. Additionally, operator 23 may further include algorithms, decision-making routines, statistical programs, etc. for analyzing and interpreting report 61. Although illustrated as being associated with wireless network help computer 22, operator 23 may be located anywhere in communication with wireless network 42, such as on user manager server 40, another server connected to the network, or even on the wireless device 12.

Figure 7:
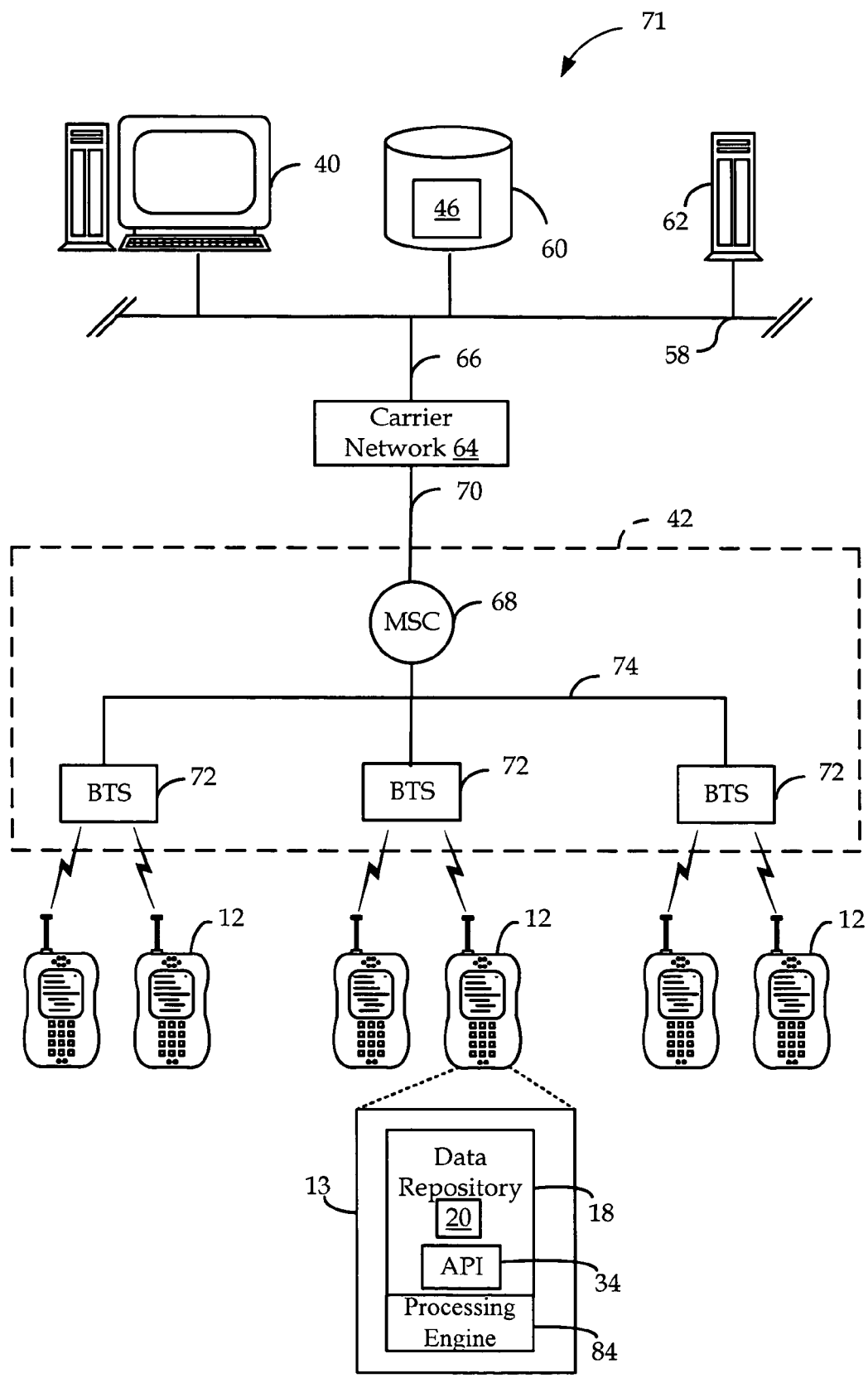
FIG. 7 is a schematic diagram of one aspect of a cellular telephone network associated with FIG. 1.

Referring to FIG. 7, in one aspect, wireless device 12 comprises a cellular telephone. A cellular telephone system 71 may include wireless network 42 connected to a wired network 58 via a carrier network 64. Wireless devices 12 are being manufactured with increased computing capabilities and often can communicate packets including voice and data over wireless network 42. As described earlier, these "smart" wireless devices 12 have APIs 34 on their local computer platform 13 that allow software developers to create software applications that operate on the cellular telephone 12, and control certain functionality on the device. FIG. 7 is a representative diagram that more fully illustrates the components of a cellular wireless network and the interrelation of the elements of one aspect of the present system. Cellular wireless network 71 is merely exemplary and can include any system whereby remote modules, such as wireless devices 12 communicate over-the-air between and among each other and/or between and among components of a wireless network 42, including, without limitation, wireless network carriers and/or servers.

In system 71, user manager server 40 can be in communication over a wired network 58 (e.g. a local area network, LAN) with a separate data repository 60 for storing firmware verification information, such as the data logs 46, gathered from the wireless devices 12. Further, a data management server 62 may be in communication with user manager server 40 to provide post-processing capabilities, data flow control, etc. User manager server 40, data repository 60 and data management server 62 may be present on the cellular telephone system 91 with any other network components that are needed to provide cellular telecommunication services. User manager server 40, and/or data management server 62 communicate with carrier network 64 through a data links 70 and 66, which may be data links such as the Internet, a secure LAN, WAN, or other network. Carrier network 64 controls messages (generally being data packets) sent to a mobile switching center ("MSC") 68. Further, carrier network 64 communicates with MSC 68 by a network 70, such as the Internet, and/or POTS ("plain old telephone service"). Typically, in network 70, a network or Internet portion transfers data, and the POTS portion transfers voice information. MSC 68 may be connected to multiple base stations ("BTS") 72 by another network 74, such as a data network and/or Internet portion for data transfer and a POTS portion for voice information. BTS 72 ultimately broadcasts messages wirelessly to the wireless devices, such as wireless devices 12, by short messaging service ("SMS"), or other over-the-air methods.

Figure 8:
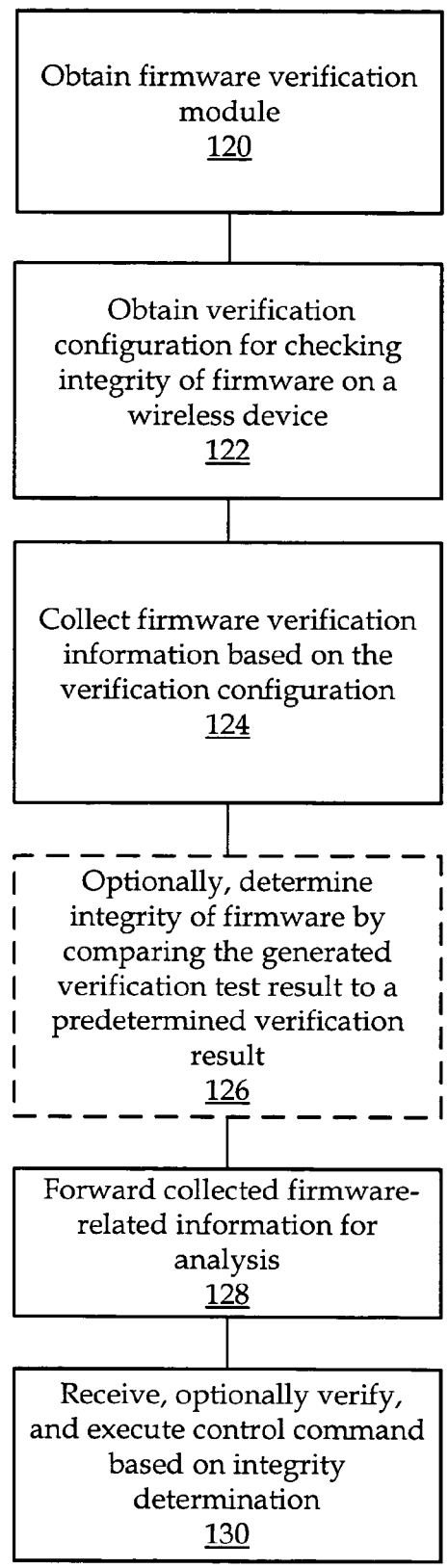
FIG. 8 is a flowchart of one aspect of a method operable on a wireless device for determining the integrity of the firmware on the wireless device.

Referring to FIG. 8, one aspect of a method for firmware integrity verification on a wireless device includes loading at least a portion of a firmware verification module 20 onto a computer platform 13 of a wireless device 12 (Block 120). For example, the firmware verification module 20 may be embodied within the hardware and/or firmware of the wireless device during the manufacture of the device. Alternatively, the firmware verification may be "pushed" by a user manager server 40 to the wireless device 12 or "pulled" from a user manager server 40 by the wireless device 12 across a wireless network 42. Alternatively, the firmware verification module 20 may be "pulled" or "pushed" depending on whether or not the wireless device 12 has the latest version of the firmware verification module 20 for the respective wireless device 12. In another alternative, loading of the firmware verification module 20 may be configurable in any manner, for example, being initiated by a predetermined event, such as the wireless device 12 having difficulty communicating with the wireless network 42, or the wireless device 12 communicating with a different network service provider. In another alternative, the pushing or pulling of the firmware verification module 20 to the wireless device 12 may be configurable in any manner, for example: being initiated by a predetermined event.

Further, this aspect of the method includes loading at least a portion of a verification configuration 65 for testing the integrity of firmware on the computer platform 13 of the wireless device 12 (Block 122). For example, verification configuration 65 may be embodied within the hardware and/or firmware of the wireless device during the manufacture of the device. Alternatively, verification configuration 65 may be "pushed" by a user manager server 40 to the wireless device 12, or "pulled" from a user manager server 40 by the wireless device 12, across a wireless network 42. In another alternative, loading of verification configuration 65 may be initiated in any manner, for example, being initiated by a predetermined event, such as the wireless device 12 having difficulty communicating with the wireless network 42, or the wireless device 12 communicating with a different network service provider. In another alternative, the pushing or pulling of the configuration 65 to the wireless device 12 may be configurable in any manner, for example: being initiated by a predetermined event.

Further, this aspect of the method includes collecting firmware verification information, including a verification test result, in accordance with verification configuration 65 (Block 124). For example, verification test result 47 may be generated by applying predetermined verification scheme 89 to firmware 14. Further, additional firmware information 15 may be retrieved from processing engine 87 of the wireless device during its operation. Both verification test result 47 and additional firmware information 15 may be stored in information log 46.

Optionally, this aspect of the method includes determining an integrity of the firmware by comparing a predetermined verification result to the generated verification test result (Block 126). In one aspect, for example, this integrity determination 11 may be recorded in information log 46.

Further, this aspect of the method includes forwarding the collected firmware verification information to another computer device for analysis (Block 128). In one aspect, for example, information log 46 is uploaded from wireless device 12 to user manager server 40 in accordance with reporting parameter 91 of verification configuration 65, such as through a standard HTTP, an FTP, or some other data transfer protocol. In other aspects, the collected firmware verification information is uploaded from the wireless device using any communication means the wireless device 12 may access.

Additionally, this aspect of the method may include receiving, optionally verifying, and executing a control command based on the analysis of the firmware integrity-related information (Block 130). As discussed earlier, remote firmware management module 21 may execute analyzer 45 to generate report 61 including integrity determination 11. Based on integrity determination 11 and/or a review of information log 47, operator 23 or another user may utilize remote firmware management module 21 to generate control command 78 to control the activity of wireless device 12. Device control module 94 may verify the authenticity and authority of control command 78, and then may execute control logic 35 to initiate control activity 29.

Figure 9:
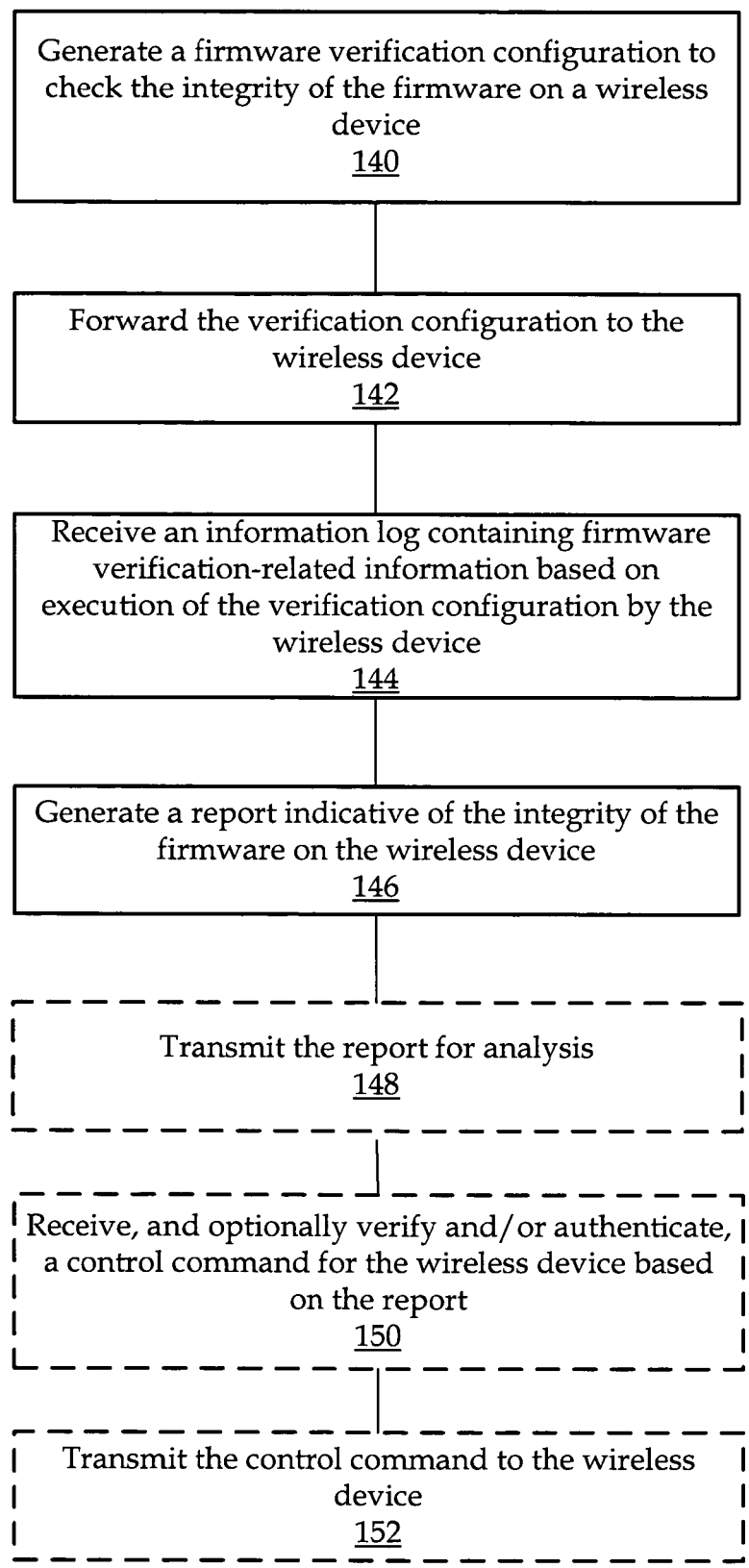
FIG. 9 is a flowchart of one aspect of a method operable on an apparatus for determining the integrity of the firmware on a wireless device.

Referring to FIG. 9, one aspect of a method operable on an apparatus to verify the integrity of firmware 14 on wireless device 12 includes generating a verification configuration to test the integrity of firmware on a wireless device (Block 140). In one aspect, a user such as a technician or operator 23 accesses firmware management module 21 and executes configurator module 44 to generate verification configuration 65 for a given wireless device 12. Configurator module 44 may utilize configuration logic 56 to determine and/or customize the various parameters that comprise verification configuration 65, and these parameters may vary depending on the type/make/model of the wireless device, the actual network service provider, and the type of firmware.

Further, this aspect of the method includes forwarding the verification configuration to the wireless device (Block 142). For example, user manager server 40 may transmit verification configuration 65 across wireless network 42 to wireless device 12. Alternatively, in another aspect, verification configuration 65 may be forwarded through a static or serial connection to wireless device 12. In another alternative, verification configuration 65 may be preloaded on wireless device 12 during manufacture.

Further, this aspect of the method includes receiving firmware verification-related information from the wireless device based on the verification configuration (Block 144). For example, user manager server 40 may receive information log 46, including verification test result 47 and/or additional firmware information 15, from wireless device 12. The data in information log 46 corresponds to a processing of verification configuration 65 by the respective wireless device 12. Additionally, in one aspect, the user manager server 40 receives information log 46 over wireless network 42. Further, information log 46 may be received either as a whole or in pieces and assembled by user manager server 40 and/or firmware management module 21. In another aspect, user manager server 40 receives the information log 46 by a static or serial connection to the wireless device 12, or from some other computer device or storage media in communication with user manager 40.

Further, this aspect of the method includes generating a report, based on the data in information log that indicates an integrity of the firmware on the wireless device (Block 146). For example, analyzer 45 generates report 61 based on comparing the generated verification test result 47 with predetermined verification result 37. Report 61 may include integrity determination 11 that, based on this comparison, indicates the predicted integrity of firmware 14.

Optionally, in one aspect, the report of the firmware integrity is forwarded for analysis (Block 148). For example, firmware management module 21 may execute verification logic 59 to transmit report 61 to another computer device, the user of wireless device, or a third party for review. In one aspect, firmware management module 21 transmits report 61 to computer device 22 for review by operator 23. Operator 23 may take action based on report 61, such as sending the user of the respective wireless device 12 a request to have the firmware 14 of the wireless device 12 replaced. In another aspect, the analysis of report 61 results in a control command 78 being issued to control operations of the wireless device. For example, if defective firmware is detected, then operator 23 or another party may issue a command, for example, to disable the device so as to prevent harm to the wireless network or to prevent unauthorized operations.

Optionally, in one aspect, the method includes receiving (and, optionally, verifying) a control command based on the firmware verification-related information in the report (Block 150). For example, firmware management module 21 may receive control command 78 from operator 23 in response to report 61. Optionally, device control module 94 may execute permission logic 25 to make permission decision 30 as to whether or not to issue control command 78 to the respective wireless device 12.

Optionally, in one aspect, the method includes sending the control command to the wireless device (Block 152). For example, device control module 94 may execute control logic 35 to forward control command 78 to wireless device 12. In one aspect, device control module 94 transmits control command 78 across wireless network 42 to wireless device 12.

Thus, the described aspects allow a party, such as a wireless network service provider, a wireless device manufacturer, a firmware manufacturer, etc., to maintain the integrity of the firmware on a wireless device. For example, the network service provider may need to detect compromised firmware so that they may provide good service to their customers and generate revenue. Further, the network service providers may need to shut-down wireless devices that have compromised firmware in order to protect their wireless networks, for example, as a wireless device with compromised firmware may use a communications protocol that interferes with other wireless devices on the wireless network. Additionally, the network service provider may need to be able to disable a wireless device when the firmware for the wireless device has become obsolete, or when the wireless device is being used on a different service provider's network in violation of an agreement.

Additionally, the described aspects allow the manufacturers of the wireless devices to configure a firmware verification application for different wireless devices and different versions of firmware so that an application does not have to be written for each version of firmware or each type of wireless device.

Additionally, the described aspects provide a firmware verification mechanism that is able to determine whether to disable the wireless device based on what part of the firmware has been compromised. For example, a buggy program may compromise the integrity of the firmware for a code segment of the firmware that merely draws entertaining pictures on the output device of the wireless device. In this situation, the described aspects allow for this determination, and therefore allow for merely notifying the user of the wireless device that the firmware needs to be repaired, rather than disabling the wireless device. In this case, disabling the wireless device may, at least, inconvenience the user of the wireless device and may cause the network service provider to lose revenue. Further, rather than disabling the device or requesting that the user of the wireless device have the wireless device serviced, the described aspects provide for reconfiguring the firmware in order to restore the integrity of the wireless device.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the actions and/or steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While the foregoing disclosure shows illustrative aspects, it should be noted that various changes and modifications could be made herein without departing from the scope of the described aspects as defined by the appended claims. Furthermore, although elements of the described aspects may be described or claimed in the singular, the plural is contemplated unless limitation to the singular is explicitly stated.

What is claimed is:

1. A wireless communication device comprising:
a platform having firmware; and
a firmware verification module operable to execute a verification configuration to collect firmware information, wherein the firmware information is indicative of an integrity of the firmware,
wherein the firmware verification module is further operable to establish a limited-access communications channel across a wireless network, the limited-access communications channel is based on a predefined limited service configuration, the limited-access communications channel is unavailable to an end user of the wireless communication device, and the verification configuration is received from another device across the wireless network.

2. The wireless communication device of claim 1, wherein the verification configuration further comprises a verification scheme, and wherein the firmware verification module is further operable to execute the verification scheme on the firmware to generate a verification test result, wherein the verification test result is indicative of the integrity of the firmware.

3. The wireless communication device of claim 2, wherein the firmware verification module further comprises a predetermined verification result, and wherein the firmware verification module is operable to compare the predetermined verification result to the generated verification test result to determine the integrity of the firmware.

4. The wireless communication device of claim 2, wherein the firmware verification module is operable to transmit the generated verification test result to the another device to determine the integrity of the firmware.

5. The wireless communication device of claim 4, wherein the firmware verification module is operable to transmit the generated verification test result across the wireless network.

6. The wireless communication device of claim 2, wherein the firmware verification scheme comprises at least one of a redundancy check and/or a test for a predetermined value at a predetermined location within the firmware and/or a check of firmware signature information and/or a test for a predetermined result of applying a predetermined function to at least a portion of the firmware.

7. The wireless communication device of claim 1, wherein the firmware verification module is operable to apply the verification configuration to at least one predetermined segment of the firmware.

8. The wireless communication device of claim 1, wherein the verification configuration comprises a verification scheme and a reporting parameter.

9. The wireless communication device of claim 8, wherein the verification scheme is selected from a plurality of verification schemes based on at least one of a type of the wireless communication device and/or an identity of a network service provider associated with the wireless communication device and/or a type of the firmware.

10. The wireless communication device of claim 8, wherein the verification configuration further comprises at least one of a tracking parameter selected from a plurality of tracking parameters, the reporting parameter selected from a plurality of reporting parameters, and a control command parameter selected from a plurality of control command parameters.

11. The wireless communication device of claim 8, wherein the verification configuration further comprises a tracking parameter that identifies additional firmware information to collect.

12. The wireless communication device of claim 1, further comprising a device control module operable to receive and execute a control command to change an operational characteristic of the wireless communication device, wherein the control command is based on the integrity of the firmware.

13. The wireless communication device of claim 12, wherein the control command comprises at least one of a disable command, an enable command, or a reconfigure command, wherein the disable command makes the wireless communication device non-operable for non-emergency communications, wherein the enable command makes the wireless communication device operational for communications, and wherein the reconfigure command sets at least one data value relating to the firmware of the wireless communication device.

14. The wireless communication device of claim 12, wherein the wireless communication device control module is further operable to check at least one of an authorization associated with an issuer of the control command and/or a verification of the control command.

15. The device of claim 12, wherein the control command comprises at least one of a disable command or an enable command, wherein the disable command makes the wireless communication device non-operable for non-emergency communications, and wherein the enable command makes the wireless device operational for communications.

16. The device of claim 1, wherein the another device is a user manager server.

17. A wireless device, comprising:
   means for controlling operations on the wireless device;
   means for applying a verification configuration to the means for controlling operations of the wireless device to collect information indicative of an integrity of the means for controlling operations of the wireless device; and
   means for establishing a limited-access communications channel across a wireless network, wherein the limited-access communications channel is based on a predefined limited service configuration, the limited-access communications channel is unavailable to an end user of the wireless device, and the verification configuration is received from another device across the wireless network.

18. An apparatus for managing the integrity of firmware on a wireless device, comprising:
   a firmware management module operable to generate and wirelessly transmit a verification configuration to the wireless device, wherein the verification configuration comprises a verification scheme to apply to the firmware to test an integrity of the firmware;
   an information repository operable to receive and store a generated verification test result based on an execution of the verification configuration by the wireless device; and
   an analyzer operable to generate an integrity determination based on the stored verification test result, wherein the integrity determination represents an integrity of the firmware.

19. The apparatus of claim 18, wherein the verification configuration further comprises a predetermined verification result selected for the wireless device.

20. The apparatus of claim 18, wherein the analyzer further comprises a predetermined verification result, and wherein the analyzer is operable to compare the generated verification test result to the predetermined verification result to generate the integrity determination.

21. The apparatus of claim 18, further comprising a device control module operable to send a control command to change an operational characteristic of the wireless device, wherein the control command is based on the integrity determination.

22. The apparatus of claim 21, wherein the device control module is operable to verify the control command before transmitting the control command to the wireless device.

23. The apparatus of claim 22, wherein the device control module comprises correlated data including a plurality of control permissions and a plurality of user identifications, and wherein the control command comprises at least one of a user identification and a control activity, and wherein the device control module comprises permission logic that compares the user identification and the control activity with the correlated data to generate a permission decision as to whether or not to carry out the control command.

24. The apparatus of claim 22, wherein the device control module is operable to receive the control command from another device located across a wireless network.

25. The apparatus of claim 18, wherein the verification configuration further comprises at least one of a tracking parameter selected from a plurality of tracking parameters and/or a reporting parameter selected from a plurality of reporting parameters and/or a control command parameter selected from a plurality of control command parameters.

26. The apparatus of claim 18, wherein the firmware management module is operable to select the verification scheme from a plurality of verification schemes.

27. The apparatus of claim 18, wherein the analyzer is further operable to generate a report comprising the integrity determination, the verification configuration, and additional firmware information collected based on the verification configuration.

28. The apparatus of claim 18, further comprising a configurator module operable to select the verification scheme from a plurality of verification schemes based on at least one of a type of the wireless device and/or an identity of a network service provider associated with the wireless device and/or a type of the firmware.

29. The apparatus of claim 18, wherein the verification scheme comprises segmenting the firmware, and wherein the integrity determination comprises a determination of the integrity of each segment of the firmware.

30. An apparatus for managing firmware integrity on a wireless device, comprising:
   means for generating and transmitting a verification configuration across a wireless network to the wireless device, wherein the verification configuration comprises a verification scheme to apply to the firmware to test an integrity of the firmware;
   means for receiving and storing a verification test result based on an execution of the verification configuration by the wireless device; and
   means for analyzing the stored verification test result and generating a report based on the analysis, wherein the report comprises an integrity determination indicating an integrity of the firmware.

31. A method of verifying firmware integrity on a wireless device, comprising:
   generating a verification configuration comprising a verification scheme to test an integrity of firmware on the wireless device;
   forwarding the verification configuration to the wireless device;
   receiving a generated verification test result based on an application of the verification scheme on the firmware by the wireless device;
   storing the received verification test result; and
   generating an integrity determination based on the stored verification test result, wherein the integrity determination indicates the integrity of the firmware.

32. The method of claim 31, where generating an integrity determination further comprises comparing the generated verification test result to a predetermined verification result.

33. The method of claim 31, further comprising sending a control command to the wireless device to change an operational characteristic of the wireless device, where the control command is based on the integrity determination.

34. The method of claim 33, further comprising verifying the control command before sending the control command to the wireless device.

35. The method of claim 34, where the control command comprises a user identification and a control activity, and where verifying the control command further comprises comparing the user identification and the control activity with a plurality of control permissions correlated with a plurality of user identifications.

36. The method of claim 31, further comprising selecting the verification scheme from a plurality of verification schemes based on at least one of a type of the wireless device and/or an identity of a network service provider associated with the wireless device and/or a type of the firmware.

37. The method of claim 31, where the verification scheme comprises segmenting the firmware, and wherein the integrity determination comprises a determination of the integrity of each segment of the firmware.

38. A method of verifying firmware integrity on a wireless device, comprising:
   receiving a verification scheme for testing an integrity of firmware on the wireless device;
   generating a verification test result based on applying the verification scheme to the firmware;
   forwarding the verification test result for analysis to determine the integrity of the firmware; and
   establishing a limited-access communications channel across a wireless network, wherein the limited-access communications channel is based on a predefined limited service configuration, the limited-access communications channel is unavailable to an end user of the wireless device; and the verification configuration is received from another device across the wireless network.

39. The method of claim 38, wherein the firmware verification scheme comprises at least one of a redundancy check, a test for a predetermined value at a predetermined location within the firmware, a check of firmware signature information, and a test for a predetermined result of applying a predetermined function to at least a portion of the firmware.

40. The method of claim 38, further comprising applying the verification scheme to at least one predetermined segment of the firmware.

41. The method of claim 38, wherein the verification scheme is selected from a plurality of verification schemes based on at least one of a type of the wireless device and/or an identity of a network service provider associated with the wireless device and/or a type of the firmware.

42. The method of claim 38, further comprising receiving a verification configuration, wherein the verification configuration comprises at least one of a tracking parameter selected from a plurality of tracking parameters and/or a reporting parameter selected from a plurality of reporting parameters and/or a control command parameter selected from a plurality of control command parameters.

43. The method of claim 38, further comprising receiving a control command to change an operational characteristic of the wireless device, where the control command is based on the verification test result.

44. A non-transitory computer-readable medium comprising instructions which, when executed by a machine, cause the machine to perform operations including:
   generating a verification configuration comprising a verification scheme to test an integrity of firmware on a wireless device;
   forwarding the verification configuration to the wireless device;
   receiving a generated verification test result based on an application of the verification scheme on the firmware by the wireless device;
   storing the received verification test result; and
   generating an integrity determination based on the stored verification test result, wherein the integrity determination indicates the integrity of the firmware.

45. At least one processor comprising:
   a circuit adapted to generate a verification configuration comprising a verification scheme to test an integrity of firmware on a wireless device;
   a communication interface adapted to
      forward the verification configuration to the wireless device;
      receive a generated verification test result based on an application of the verification scheme on the firmware by the wireless device;
   the circuit further adapted to
      store the received verification test result; and
      generate an integrity determination based on the stored verification test result, wherein the integrity determination indicates the integrity of the firmware.

46. A non-transitory computer-readable medium comprising instructions which, when executed by a machine, cause the machine to perform operations including:
   receiving a verification scheme for testing an integrity of firmware on a wireless device;
   generating a verification test result based on applying the verification scheme to the firmware;
   forwarding the verification test result for analysis to determine the integrity of the firmware; and
   establishing a limited-access communications channel across a wireless network, wherein the limited-access communications channel is based on a predefined limited service configuration, the limited-access communications channel is unavailable to an end user of the device; and the verification configuration is received from another device across the wireless network.

47. At least one processor comprising:
a communication interface adapted to receive a verification scheme for testing an integrity of firmware on a wireless device;
a circuit adapted to generate a verification test result based on applying the verification scheme to the firmware;
the communication interface further adapted to
   forward the verification test result for analysis to determine the integrity of the firmware; and
   establish a limited-access communications channel across a wireless network, wherein the limited-access communications channel is based on a predefined limited service configuration, the limited-access communications channel is unavailable to an end user of the device; and the verification configuration is received from another device across the wireless network.

* * * * *